(12) United States Patent
Takeyama et al.

(10) Patent No.: US 7,439,794 B2
(45) Date of Patent: Oct. 21, 2008

(54) POWER SOURCE CIRCUIT

(75) Inventors: Yoshikazu Takeyama, Fujisawa (JP); Jumpei Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/748,132

(22) Filed: May 14, 2007

(65) Prior Publication Data

US 2007/0268064 A1 Nov. 22, 2007

(30) Foreign Application Priority Data

May 17, 2006 (JP) .............................. 2006-138140

(51) Int. Cl.
*G05F 1/10* (2006.01)

(52) U.S. Cl. ..................................... 327/536

(58) Field of Classification Search .................. 327/535, 327/536, 537
See application file for complete search history.

(56) References Cited

U.S. PATENT DOCUMENTS

| | | | | |
|---|---|---|---|---|
| 6,128,242 | A * | 10/2000 | Banba et al. ................. | 365/226 |
| 6,285,622 | B1 * | 9/2001 | Haraguchi et al. ........... | 365/226 |
| 7,312,649 | B2 * | 12/2007 | Origasa et al. ............... | 327/536 |
| 7,315,194 | B2 * | 1/2008 | Shiga et al. .................. | 327/535 |
| 2005/0275450 | A1 | 12/2005 | Shiga et al. | |
| 2006/0176103 | A1 | 8/2006 | Cheon | |

FOREIGN PATENT DOCUMENTS

| | | |
|---|---|---|
| JP | 11-154396 | 6/1999 |
| JP | 2003-242790 | 8/2003 |
| JP | 2005-354782 | 12/2005 |

OTHER PUBLICATIONS

U.S. Appl. No. 11/939,984, filed Nov. 14, 2007, Nakai et al.

* cited by examiner

*Primary Examiner*—Jeffrey S Zweizig
(74) *Attorney, Agent, or Firm*—Oblon, Spivak, McClelland, Maier & Neustadt, P.C.

(57) ABSTRACT

A power source circuit adapted to output a first set potential which is set according to a first selection signal, or a second set potential which is set according to a second selection signal and higher than the first set potential, has an output terminal adapted to output the first set potential or the second set potential; a first boosting circuit adapted to boost a voltage supplied from a power source and to output the boosted voltage to the output terminal; a second boosting circuit adapted to boost the voltage supplied from the power source and to output the boosted voltage to the output terminal; a voltage dividing circuit adapted to output a monitor potential by dividing the output potential outputted from the output terminal according to the first selection signal, or to output a monitor potential by dividing the output potential and reducing a voltage dividing ratio of the monitor potential with respect to the output potential according to the second selection signal; a comparison amplifier adapted to compare the monitor potential with a reference potential, and to output a flag signal for activating the boosting circuit when the monitor potential is lower than the reference potential; and a logic circuit adapted to receive the flag signal from the comparison amplifier, and when receiving the first selection signal, to output a first clock signal for making the first boosting circuit perform the boosting operation, and adapted to receive the flag signal from the comparison amplifier, and when receiving the second selection signal, to output a second clock signal for making the second boosting circuit perform the boosting operation, together with the first clock signal.

12 Claims, 5 Drawing Sheets

POWER SOURCE CIRCUIT

CROSS-REFERENCE TO RELATED APPLICATION

This application is based upon and claims the benefit of priority from the prior Japanese Patent Application No. 2006-138140, filed on May 17, 2006, the entire contents of which are incorporated herein by reference.

BACKGROUND OF THE INVENTION

1. Field of the Invention

The present invention relates to a power source circuit provided with a boosting circuit for boosting power source voltage.

2. Background Art

Conventionally, a semiconductor storage device such as, for example, a NAND type flash memory is provided with a power source circuit which makes power source voltage boosted by a boosting circuit and supplied.

For example, a semiconductor storage device, such as a NAND type flash memory, needs a potential higher than a power source voltage for data reading, writing and erasing operations. For this reason, such a semiconductor storage device is provided with a boosting circuit for boosting power source voltage and a voltage detecting circuit for maintaining the boosted potential at a set potential.

The boosting circuit boosts the power source voltage by being constituted in such a manner that a MOS transistor and a capacitor are connected in series, and one end of the capacitor is connected with mutually complementary CLK and CLKB signals.

Furthermore, the voltage detecting circuit is provided with a voltage dividing circuit and a comparison amplifier, and an output terminal of the boosting circuit and a ground potential are connected in series via the voltage dividing circuit. The comparison amplifier compares a monitor potential outputted by the voltage dividing circuit with a reference potential.

As an example for changing a detection level of the voltage detecting circuit, there is a method in which a plurality of n-type MOS transistors whose source is set as the ground potential are connected to connection points between voltage dividing resistors of the voltage dividing circuit, and selection signals are inputted into the gates of the MOS transistors, respectively.

The set potential of the output of the boosting circuit is determined by the selection signal. When the output of the boosting circuit is lower than the set potential, the monitor potential is lower than the reference potential, so that the comparison amplifier switches its output to, for example, "High". This output sets the boosting circuit to an activated state, so that the output of the boosting circuit is boosted by the CLK/CLKB signal.

On the contrary, when the output of the boosting circuit is higher than the set potential, the monitor potential is higher than the reference potential, so that the comparison amplifier switches its output to, for example, "Low". This output sets the boosting circuit to a deactivated state, and stops the operation of the boosting circuit by interrupting the CLK/CLKB signal.

As described above, the power source detecting circuit activates and deactivates the boosting circuit, thereby making it possible to maintain the output of the boosting circuit in the vicinity of the set potential.

However, in the above described boosting operation, the output potential does not always remain at a fixed potential, but vibrates in the vicinity of the set potential. This phenomenon is referred to as a ripple, which is increased and decreased by an RC time constant based on a resistance value of the voltage dividing resistors, an operation delay of the comparison amplifier, and a boosting capability of the boosting circuit. When the resistance value of the voltage dividing resistors is large, when the operation delay of the comparison amplifier is large, and when the boosting capability of the boosting circuit is large, the ripple is increased.

Here, when the resistance value of each voltage dividing resistor is the same, and the same comparison amplifier is also used, the reaction rate of the voltage detecting circuit to variation of the potential of the boosting circuit is fixed. Therefore, the switching time of the voltage detecting circuit is almost fixed.

Furthermore, the output potential and current of the boosting circuit are in a relation in which when the output potential of the boosting circuit is high, the output current is small, and in which when the output potential of the boosting circuit is low, the output current is large.

Therefore, in the output of the boosting circuit when the set potential of the voltage detecting circuit is low, the current which can be outputted for a fixed time is large, and hence the ripple is increased.

On the other hand, when the set potential of the voltage detecting circuit is high, the current which can be outputted for the fixed time is small, and hence the ripple is reduced.

Here, in another aspect, data are written in the cells of the NAND type flash memory by using the potential boosted by the boosting circuit.

However, the cell characteristics are not uniform for all the cells, which causes the write-enable write potential for the cell to be different.

Accordingly, the NAND type flash memory has a characteristic that while the write potential is gradually increased from a suitable initial value, the writing operation is performed each time the write potential is increased, so as to make it possible to complete the writing operation successively from a cell having a low write-enable potential to a cell having a high write-enable potential.

In order to realize such writing operation, each voltage dividing resistance of the voltage detecting circuit, which determines the set potential of the boosting circuit, is adjusted so as to obtain the desired potential gradually increased in this manner.

Thus, as described above, in the case where the set potential is changed, there is a problem that when the set potential is low, the ripple in the output of the boosting circuit is increased.

In the writing operation to the cells of the NAND type flash memory, when the ripple in the word line of selected cells and unselected cells is large, for example, the distribution of threshold voltage Vth of the write cells is dispersed, and the unselected cells are erroneously written. Therefore, it is preferred that the ripple is small.

However, as described above, in the writing operation to the cells having a low write-enable potential, when the output of the boosting circuit is set to low by adjusting the voltage dividing resistance of the power source detecting circuit, the ripple is increased in the conventional circuit, so that the writing characteristic to the memory cell is deteriorated.

As the conventional power source circuit, there is provided a circuit including a plurality of boosting circuits which boost a voltage supplied from a power source and generate an output potential, a plurality of CP output control circuits which monitor the output potential and output a signal for instructing activation/deactivation of the boosting circuit, an oscillator to which the output (voltage for performing OSC control operation) of the CP output control circuit is inputted, and a clock buffer circuit to which the oscillation output of the oscillator is inputted, and which outputs a signal to the boosting circuit (see, for example, Japanese Patent Laid-Open Publication No. 11-154396).

The respective CP output control circuits are designed to operate stepwise according to the transition of the output voltage, so as to make their output detection voltages different from each other.

Furthermore, the above described conventional power source circuit controls the number of the boosting circuits which are operated stepwise according to the transition of the output voltage, in order to reduce the ripple with respect to one set potential.

Therefore, in the above described conventional technique, it is not possible to reduce the set potential dependency of the boosting capability and to reduce the ripple, in correspondence with a plurality of set potentials.

SUMMARY OF THE INVENTION

According one aspect of the present invention, there is provided: a power source circuit adapted to output a first set potential which is set according to a first selection signal, or a second set potential which is set according to a second selection signal and higher than the first set potential, comprising an output terminal adapted to output the first set potential or the second set potential; a first boosting circuit adapted to boost a voltage supplied from a power source and to output the boosted voltage to the output terminal; a second boosting circuit adapted to boost the voltage supplied from the power source and to output the boosted voltage to the output terminal; a voltage dividing circuit adapted to output a monitor potential by dividing the output potential outputted from the output terminal according to the first selection signal, or to output a monitor potential by dividing the output potential and reducing a voltage dividing ratio of the monitor potential with respect to the output potential according to the second selection signal; a comparison amplifier adapted to compare the monitor potential with a reference potential, and to output a flag signal for activating the boosting circuit when the monitor potential is lower than the reference potential; and a logic circuit adapted to receive the flag signal from the comparison amplifier, and when receiving the first selection signal, to output a first clock signal for making the first boosting circuit perform the boosting operation, and adapted to receive the flag signal from the comparison amplifier, and when receiving the second selection signal, to output a second clock signal for making the second boosting circuit perform the boosting operation, together with the first clock signal.

DETAILED DESCRIPTION

A power source circuit according to an embodiment of the present invention is adapted, among a plurality of boosting circuits connected in parallel with each other, to control the number of boosting circuits to be operated according to a set potential, so as to adjust the boosting capability (output current).

This makes it possible to reduce the set potential dependency of the restoration time of the output of the power source circuit to the set potential, and to reduce the ripple of the output, when a load is connected to the output of the power source circuit.

In the following, an embodiment according to the present invention will be described with reference to the accompanying drawings. It should be noted that although a case where a power source circuit is provided with three boosting circuits is described in the present embodiment, the power source circuit may be provided with two boosting circuits, or four or more boosting circuits, and the present invention can also be similarly applied to such power source circuit.

Embodiment

Figure 1:
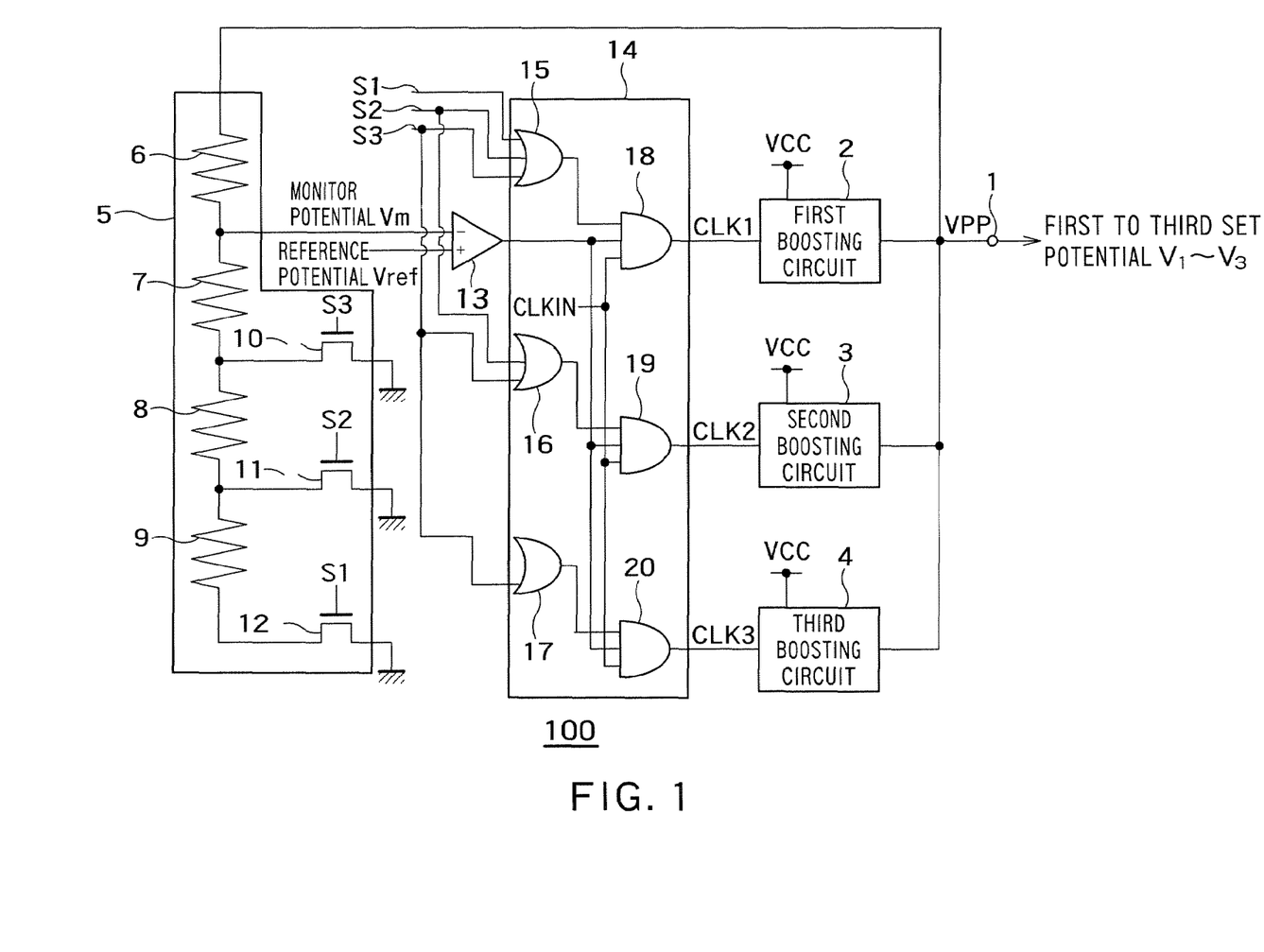
FIG. 1 is a figure showing an arrangement of a power source circuit according to an embodiment as an aspect of the present invention.
Figure 2:
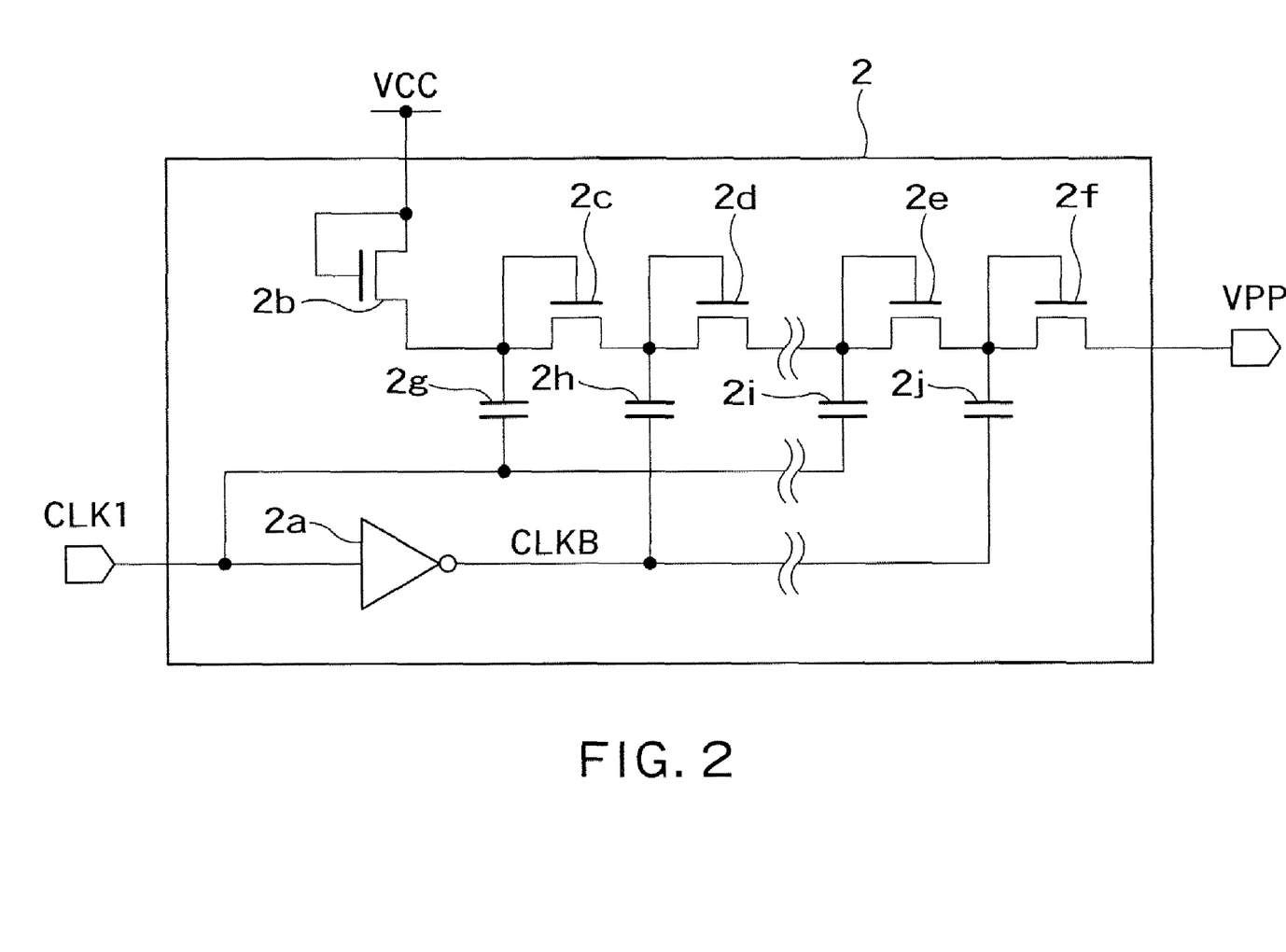
FIG. 2 is a figure showing an example of a boosting circuit applied to the power source circuit shown in FIG. 1.

FIG. 1 is a figure showing an arrangement of a power source circuit 100 according to an embodiment as an aspect of the present invention. FIG. 2 is a figure showing an example of a boosting circuit applied to the power source circuit shown in FIG. 1.

As shown in FIG. 1, the power source circuit 100 outputs one of a first set potential V1, a second set potential V2, and a third set potential V3.

The first set potential V1 which is set according to a first selection signal S1. The second set potential V2 which is set according to a second selection signal S2 and is higher than the first set potential V1. The third set potential V3 which is set according to a third selection signal S3 and is higher than the second set potential V2.

As shown in FIG. 1, the power source circuit 100 includes an output terminal 1 which outputs one of the first set potential V1, the second set potential V2, and the third set potential V3, a first boosting circuit 2 which boosts a voltage supplied from a power source VCC and outputs the boosted voltage to the output terminal 1 according to a first clock signal CLK1, a second boosting circuit 3 which boosts the voltage supplied from the power source VCC and outputs the boosted voltage to the output terminal 1 according to a second clock signal CLK2, and a third boosting circuit 4 which boosts the voltage supplied from the power source VCC and outputs the boosted voltage to the output terminal 1 according to a third clock signal CLK3.

A load connected to the output terminal 1 includes a non-volatile semiconductor memory device, such as a NAND type, a NOR type, a DINOR type, an AND type EEPROM, and a circuit which requires a boosted potential higher than the power source VCC.

The first boosting circuit 2 includes, for example as shown in FIG. 2, an inverter circuit 2a which receives the first clock signal CLK1 and outputs a clock signal CLKB obtained by inverting the first clock signal CLK1, a MOS transistor 2b whose source and gate are connected to the power supply potential VCC, MOS transistors 2c to 2f whose source and gate connected with each other, and which are connected in series between the drain of the MOS transistor 2b and the output terminal 1, and capacitors 2g to 2j which are connected to the source of the MOS transistors 2c to 2f, respectively.

Here, the first clock signal CLK1 is inputted to the capacitors 2g and 2i, and the output of inverter circuit 2a is connected to the capacitors 2h and 2j. Thereby, for example, the MOS transistors 2c to 2f are alternately operated by inputting the first clock signal CLK1 to the first boosting circuit 2, so that the capacitors 2g to 2j are successively charged so as to effect a boosting operation. Then, the boosted potential is outputted as an output potential VPP.

It should be noted that as described above, the capability of the boosting operation of the first boosting circuit 2 can be improved by increasing the capacitance of the capacitors 2g to 2j. Furthermore, the first boosting circuit 2 shown in FIG. 2 is exemplary, and the boosting circuit applied to the present embodiment may only be capable of boosting the power source potential VCC on the basis of the input of the first clock signal CLK1 and outputting the boosted potential.

It should be noted that the second and third boosting circuits 3 and 4 may also have the same circuit arrangement as the first boosting circuit 2. In this case, the second and third boosting circuits 3 and 4 operate according to the inputs of the second and third clock signals CLK2 and CLK3 similarly to the first boosting circuit 2.

Furthermore, the first boosting circuit 2 may be set to have a boosting capability higher than that of the second boosting circuit 3. Furthermore, the second boosting circuit 3 may be set to have a boosting capability higher than that of the third boosting circuit 4. That is, by setting a boosting circuit, which is made to additionally perform the boosting operation, to have a lower boosting capability, it is possible to reduce variation of the boosting capability of the power source circuit 100 as a whole, even when the number of boosting circuits made to perform the boosting operation is changed according to the set potential.

Furthermore, the power source circuit 100 includes a voltage dividing circuit 5 which divides the output potential VPP outputted from the output terminal 1 by resistance division and outputs a monitor potential Vm according to the first selection signal S1, or which reduces the voltage dividing ratio of the monitor potential Vm with respect to the output potential VPP according to the second selection signal S2 and outputs the monitor potential Vm, or which further reduces the voltage dividing ratio of the monitor potential Vm with respect to the output potential VPP according to the third selection signal S3 and outputs the monitor potential Vm.

The voltage dividing circuit 5 includes a first resistor 6 whose one end is connected to the output terminal 1, a second resistor 7 whose one end is connected to the other end of the first resistor 6, a third resistor 8 whose one end is connected to the other end of the second resistor 7, and a fourth resistor 9 whose one end is connected to the other end of the third resistor.

Furthermore, the voltage dividing circuit 5 includes a first MOS transistor 10 as a first switch circuit which is connected between the other end of the second resistor 7 and a ground potential VSS, and turned on according to the input of the first selection signal S1, a second MOS transistor 11 as a second switch circuit which is connected between the other end of the third resistor 8 and the ground potential VSS, and turned on according to the input of the second selection signal S2, and a third MOS transistor 12 as a third switch circuit which is connected between the other end of the fourth resistor 9 and the ground potential VSS, and turned on according to the input of the third selection signal S3.

Moreover, the voltage dividing circuit 5 is arranged to output a potential between the first resistor 6 and the second resistor 7 as the monitor potential Vm.

That is, when the first selection signal S1 (for example, whose signal level is "High", that is, a logical value of "1") is inputted to the gate of the third MOS transistor 12 of the voltage dividing circuit 5, the third MOS transistor 12 is turned on. Then, the resistance division of the voltage dividing circuit 5 is constituted by the second to fourth resistors 7, 8 and 9 connected in series with the first resistor 6, so that the voltage dividing ratio of the monitor potential Vm with respect to the output potential VPP is determined. As a result, the monitor potential Vm is outputted from the voltage dividing circuit 5 at this voltage dividing ratio.

Furthermore, when the second selection signal S2 (for example, whose signal level is "High", that is, a logical value of "1") is inputted to the gate of the second MOS transistor 11 of the voltage dividing circuit 5, the second MOS transistor 11 is turned on. Then, the resistance division of the voltage dividing circuit 5 is constituted by the second and third resistors 7 and 8 connected in series with the first resistor 6, so that the voltage dividing ratio of the monitor potential Vm with respect to the output potential VPP is determined so as to be reduced. As a result, the monitor potential Vm is outputted from the voltage dividing circuit 5 at this voltage dividing ratio.

Furthermore, when the third selection signal S3 (for example, whose signal level is "High", that is, a logical value of "1") is inputted to the gate of the first MOS transistor 10 of the voltage dividing circuit 5, the first MOS transistor 10 is turned on. Then, the resistance division of the voltage dividing circuit 5 is constituted by the second resistor 7 and the first resistor 6, so that the voltage dividing ratio of the monitor potential Vm with respect to the output potential VPP is determined so as to be further reduced. As a result, the monitor potential Vm is outputted from the voltage dividing circuit 5 at this voltage dividing ratio.

It should be noted that here, for example, the MOS transistors are selected for the first to third switch circuits, but elements or circuits which are capable of switching on and off the supply of electric potential and whose on/off states are controlled on the basis of the above described first to third selection signals S1 to S3, may also be selected for the first to third switch circuits.

Furthermore, the power source circuit 100 includes a comparison amplifier 13 which compares the monitor potential Vm with a reference potential Vref, and which when the monitor potential Vm is lower than the reference potential Vref, outputs a flag signal for activating the first to third boosting circuits 2, 3 and 4.

Furthermore, the power source circuit 100 includes a logic circuit 14 to which the output of the comparison amplifier 13 is inputted, and to which the first selection signal S1, the second selection signal S2, or the third selection signal S3 is inputted.

The logic circuit 14 includes a first OR circuit 15 which receives any one of the first selection signal S1, the second selection signal S2, or the third selection signals S3 so as to output a signal, a second OR circuit 16 which receives either of the second selection signal S2 or the third selection signal S3 so as to output a signal, and a third OR circuit 17 which receives the third selection signal S3 so as to output a signal.

Furthermore, the logic circuit 14 includes a first AND circuit 18 which receives the output of the first OR circuit 15, the output of the comparison amplifier 13 and a clock signal CLKIN, and outputs the first clock signal CLK1 to the first boosting circuit 2, a second AND circuit 19 which receives the output of the second OR circuit 16, the output of the comparison amplifier 13 and the clock signal CLKIN, and outputs the second clock signal CLK2 to the second boosting circuit 3, and a third AND circuit 20 which receives the output of the third OR circuit 17, the output of the comparison amplifier 13 and the clock signal CLKIN, and outputs the third clock signal CLK3 to the third boosting circuit 4.

When receiving the flag signal (for example, whose signal level is "High", that is, a logical value of "1") from the comparison amplifier 13 and the first selection signal S1 (for example, whose signal level is "High", that is, a logical value of "1"), the logic circuit 14 outputs the first clock signal CLK1 which is synchronized with the clock signal CLKIN and makes the first boosting circuit 2 perform the boosting operation.

Similarly, when receiving the flag signal from the comparison amplifier 13 and the second selection signal S2 (for example, whose signal level is "High", that is, a logical value of "1"), the logic circuit 14 outputs, together with the first clock signal CLK1, the second clock signal CLK2 which is synchronized with the clock signal CLKIN and makes the second boosting circuit 3 perform the boosting operation.

Similarly, when receiving the flag signal from the comparison amplifier 13 and the third selection signal S3 (for example, whose signal level is "High", that is, a logical value of "1"), the logic circuit 14 outputs, together with the first clock signal CLK1 and the second clock signal CLK2, the third clock signal CLK3 which is synchronized with the clock signal CLKIN and makes the third boosting circuit 4 perform the boosting operation.

It should be noted that here, it is assumed that when the output of the comparison amplifier 13 is not the flag signal, and when the first to third selection signals S1 to S3 are not inputted, each of the signal levels is "Low", and a logical value of "0" is inputted to each input of the logic circuit 14.

After receiving the first selection signal S1, the logic circuit 14 receives the second selection signal S2, and then further receives the third selection signal S3. Therefore, the output potential VPP of the power source circuit 100 is changed in order from the first set potential V1 which is a low set potential to the third set potential V3 which is a high set potential. Thereby, for example, when the power source circuit 100 is applied to the NAND type flash memory, the writing operation to the cells can be shifted from the low potential to the high potential.

Here, the boosting operation of the power source circuit 100 having the above described arrangement is explained.

Figure 3:
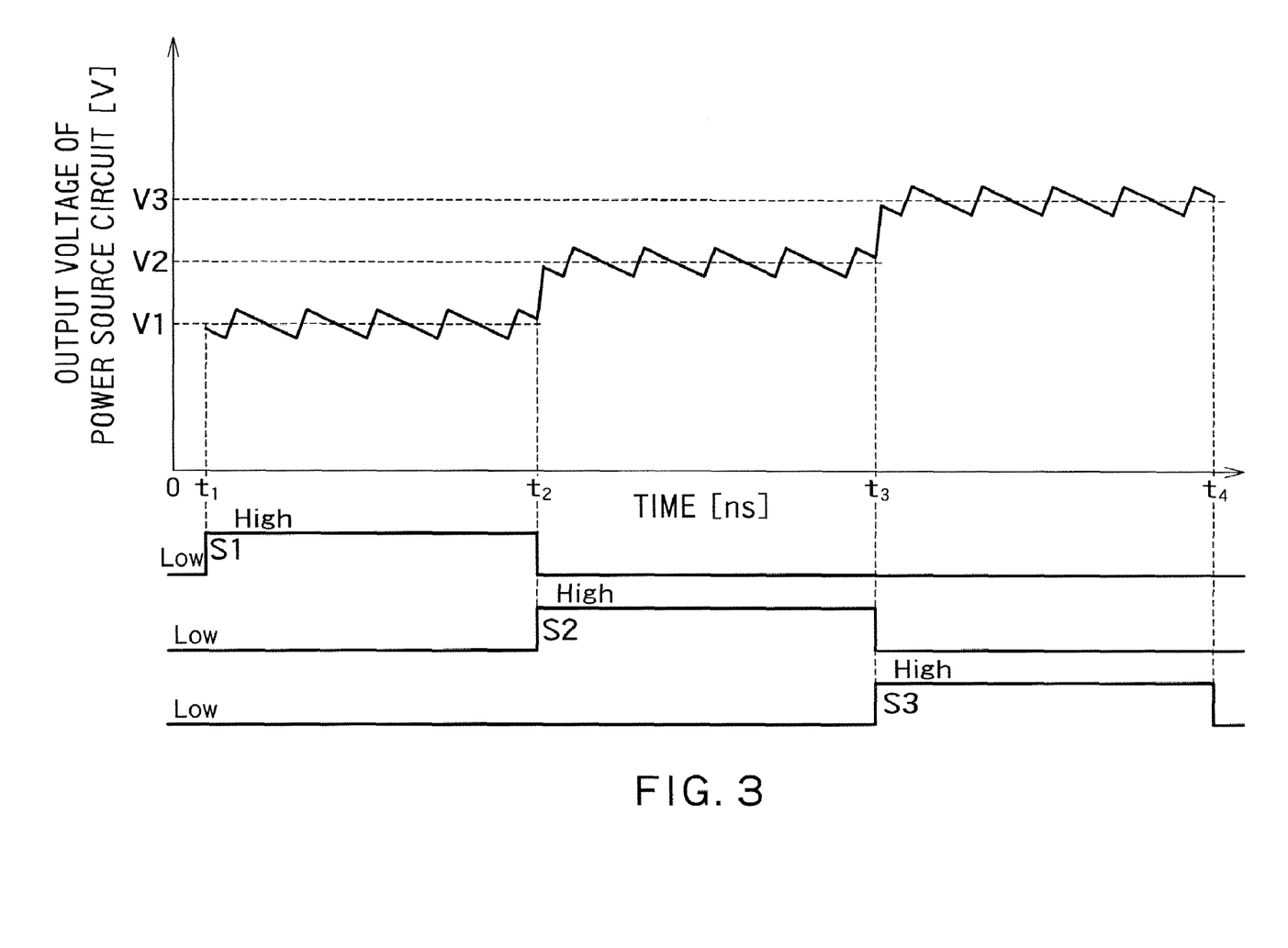
FIG. 3 is a figure showing a relation between timing waveforms (time) of the respective selection signals for controlling the boosting operation of the power source circuit according to the embodiment of the present invention, and the output of the power source circuit.

FIG. 3 is a figure showing a relation between timing waveforms (time) of the respective selection signals for controlling the boosting operation of the power source circuit according to the embodiment of the present invention, and the output of the power source circuit. It should be noted that in the figure, it is assumed that the initial condition is a state where the first to third selection signals S1 to S3 are not inputted, and here, signals of the "Low" level, that is, a logical value of "0" are inputted to the voltage dividing circuit 5 and the logic circuit 14.

As shown in FIG. 3, first, the first selection signal S1 (here, a signal of "High" level, that is, a logical value of "1") is inputted at time t1 to the third MOS transistor 12 of the voltage dividing circuit 5 and the first OR circuit 15 of the logic circuit 14.

Thereby, the resistance division of the voltage dividing ratio as described above is constituted in the voltage dividing circuit 5, so that the voltage dividing circuit 5 outputs the monitor potential Vm. The comparison amplifier 13 compares the monitor potential Vm with the reference potential Vref, and outputs the flag signal when the monitor potential Vm is lower than the reference potential Vref.

Then, when receiving the first selection signal S1, the logic circuit 14 which has received the flag signal, outputs from the first AND circuit 18, the first clock signal CLK1 which is synchronized with the clock signal CLKIN and makes the first boosting circuit 2 perform the boosting operation.

On the basis of the first clock signal CLK1, the first boosting circuit 2 repeats the boosting operation during a period from time t1 when the first selection signal S1 is inputted to time t2.

With the above described operation, the power source circuit 100 operates so as to output the first set potential V1 from the output terminal 1 during the period from time t1 when the first selection signal S1 is inputted to time t2.

Next, at time t2, the second selection signal S2 (here, a signal of "High" level, that is, a logical value of "1") is inputted to the second MOS transistor 11 of the voltage dividing circuit 5, and the first OR circuit 15 and the second OR circuit 16 of the logic circuit 14.

Thereby, the resistance division of the voltage dividing ratio as described above is constituted in the voltage dividing circuit 5, so that the voltage dividing circuit 5 outputs the monitor potential Vm. The comparison amplifier 13 compares the monitor potential Vm with the reference potential Vref, and outputs the flag signal when the monitor potential Vm is lower than the reference potential Vref.

Then, when receiving the second selection signal S2, the logic circuit 14 which has received the flag signal, outputs from the first AND circuit 18, the first clock signal CLK1 which is synchronized with the clock signal CLKIN and makes the first boosting circuit 2 perform the boosting operation, and outputs from the second AND circuit 19, the second clock signal CLK2 which is synchronized with the clock signal CLKIN and makes the second boosting circuit 3 perform the boosting operation.

On the basis of the first clock signal CLK1, the first boosting circuit 2 repeats the boosting operation during a period from time t2 when the second selection signal S2 is inputted to time t3. Similarly, on the basis of the second clock signal CLK2, the second boosting circuit 3 repeats the boosting operation during the period from time t2 to time t3.

With the above described operation, the power source circuit 100 operates so as to output the second set potential V2 from the output terminal 1 during the period from time t2 when the second selection signal S2 is inputted to time t3.

Next, at time t3, the third selection signal S3 (here, a signal of "High" level, that is, a logical value of "1") is inputted to the first MOS transistor 10 of the voltage dividing circuit 5, and the first OR circuit 15, the second OR circuit 16 and the third OR circuit 17 of the logic circuit 14.

Thereby, the resistance division of the voltage dividing ratio further lowered as described above is constituted in the voltage dividing circuit 5, so that the voltage dividing circuit 5 outputs the monitor potential Vm. The comparison amplifier 13 compares the monitor potential Vm with the reference potential Vref, and outputs the flag signal when the monitor potential Vm is lower than the reference potential Vref.

Then, when receiving the third selection signal S3, the logic circuit 14 which has received the flag signal, outputs from the first AND circuit 18, the first clock signal CLK1 which is synchronized with the clock signal CLKIN and makes the first boosting circuit 2 perform the boosting operation, outputs from the second AND circuit 19, the second clock signal CLK2 which is synchronized with the clock signal CLKIN and makes the second boosting circuit 3 perform the boosting operation, and outputs from the third AND circuit 20, the third clock signal CLK3 which is synchronized with the clock signal CLKIN and makes the third boosting circuit 4 perform the boosting operation.

On the basis of the first clock signal CLK1, the first boosting circuit 2 repeats the boosting operation during a period from time t3 when the third selection signal S3 is inputted to time t4. Similarly, on the basis of the second clock signal CLK2, the second boosting circuit 3 repeats the boosting operation during the period from time t3 to time t4. Similarly, on the basis of the third clock signal CLK3, the third boosting circuit 4 repeats the boosting operation during the period from time t3 to time t4.

With the above described operation, the power source circuit 100 operates so as to output the third set potential V3 from the output terminal 1 during the period from time t3 when the second selection signal S3 is inputted to time t4.

As shown in FIG. 3, in the case where the set potential is increased, the selection signal is successively changed, so that as the set potential is increased, the number of boosting circuits which are activated is increased, and thereby the set potential dependency of the output capability of the power source circuit 100 is reduced.

That is, when the set potential is set to the lowest first set potential V1, the boosting capability of the boosting circuit is most increased. Therefore, in this case, the first selection signal S1 is inputted, so as to activate only the first boosting circuit 2.

When the set potential is set to the middle second set potential V2, the boosting capability of the boosting circuit is in the middle. Therefore, in order to boost the boosting capability, the second selection signal S2 is inputted to activate the first boosting circuit 2 and the second boosting circuit 3.

Furthermore, when the set potential is set to the highest third set potential V3, the boosting capability of the boosting circuit is most lowered. Therefore, in order to further boost the boosting capability, the third selection signal S3 is inputted to activate the first boosting circuit 2, the second boosting circuit 3, and the third boosting circuit 4.

By reducing the set potential dependency of the output capability of the power source circuit 100, the set potential dependency of the ripple of the output potential is also reduced.

Figure 4:
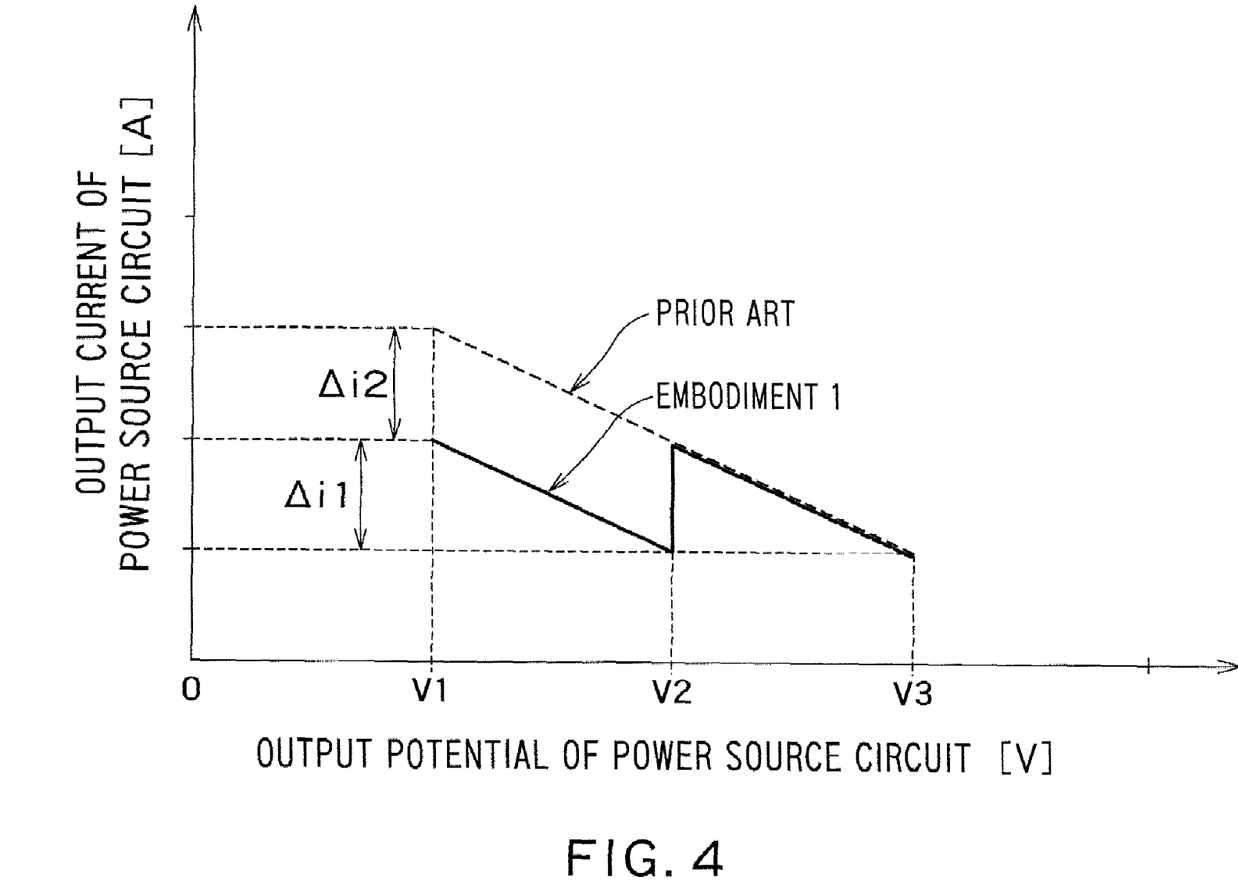
FIG. 4 is a figure showing a relation between the output potential and the output current of the power source circuit according to the embodiment as an aspect of the present invention.

Here, a relation between the set potential and the boosting capability (output current) of the power source circuit 100 in the above described operation is explained. FIG. 4 is a figure showing a relation between the output potential and the output current of the power source circuit 100 according to the embodiment as an aspect of the present invention.

As shown in FIG. 4, in the conventional power source circuit, the number of the boosting circuits which are activated is not changed according to the set potential. Therefore, in this power source circuit, the boosting capability (output current) is at a maximum when the output potential is set to the first set potential V1, and the boosting capability is monotonously decreased as the output potential is changed to the third set potential V3.

On the other hand, in the power source circuit 100 according to the embodiment, the number of the boosting circuits which are activated is increased as the set potential is increased. Furthermore, in the power source circuit 100, the number of the boosting circuits which are activated is decreased as the set potential is decreased. Therefore, it is possible to reduce the fluctuation width of the boosting capability of the power source circuit 100 as a whole.

As shown in FIG. 4, in the power source circuit 100 according to the embodiment, the output current of the power source circuit 100 is changed by Δi1, and hence it is possible to reduce the fluctuation width of the boosting capability by Δi2 as compared with the conventional power source circuit.

Figure 5:
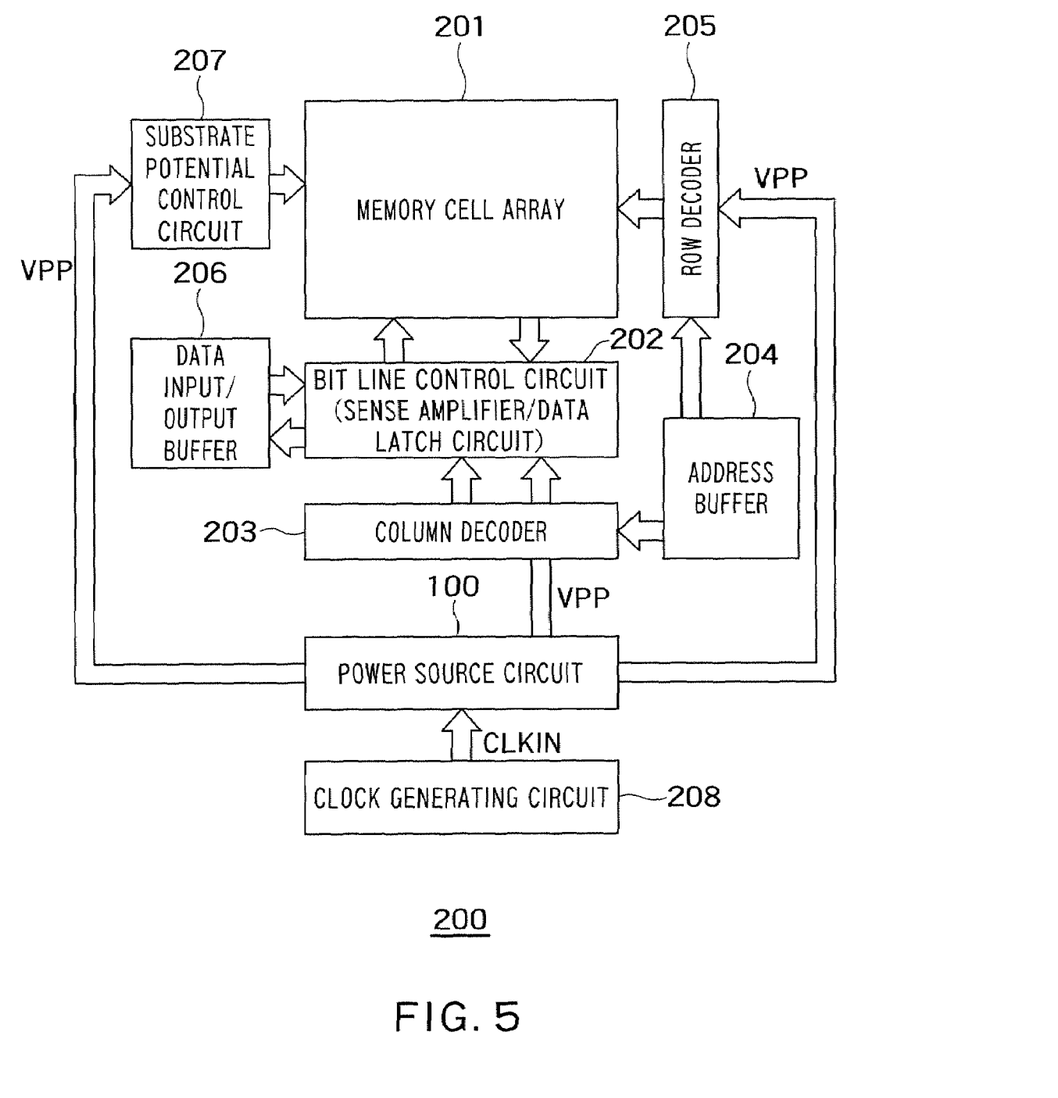
FIG. 5 is a block diagram showing an example of a NAND type flash memory provided with the power source circuit according to the embodiment as the aspect of the present invention.

Here, an embodiment in which the power source circuit 100 performing the above described operations is applied to a NAND type flash memory is explained.

FIG. 5 is a block diagram showing an example of a NAND type flash memory provided with the power source circuit according to the embodiment as the aspect of the present invention.

As shown in FIG. 5, a semiconductor storage device 200, which is a NAND type flash memory, is provided with a bit line control circuit 202 for writing and reading data to and from a memory cell array 201 as memory means.

The bit line control circuit 202 is connected to a data input/output buffer 206. Furthermore, the bit line control circuit 202 receives as input an output of a column decoder 203 which receives an address signal from an address buffer 204.

Furthermore, for the memory cell array 201, there are provided a row decoder 205 for controlling a control gate and a selection gate, and a substrate potential control circuit 207 for controlling the potential of the p type substrate (or p type well) in which the memory cell array 201 is formed.

Furthermore, the semiconductor storage device 200 is provided with a clock generating circuit 208 and the power source circuit 100 according to the present embodiment.

The power source circuit 100 supplies the output potential VPP to the bit line control circuit 202, the row decoder 205, and the substrate potential control circuit 207, when reading/writing/erasing operations are performed to the memory cell array 201.

As described above, the power source circuit 100 is capable of supplying the output potential VPP whose ripple is reduced, to the above described circuit arrangement.

As described above, with the power source circuit according to the present embodiment, it is possible to reduce the set potential dependency of the boosting capability and to reduce the ripple.

As a result, for example, in the writing operation to the cells of the NAND type flash memory, it is possible to reduce the ripple of the word line of selected cells and unselected cells, to narrow the distribution of threshold voltage Vth of the write cells, and to reduce erroneous writing to the unselected cells, and the like.

What is claimed is:

1. A power source circuit adapted to output a first set potential which is set according to a first selection signal, or a second set potential which is set according to a second selection signal and higher than the first set potential, comprising:

an output terminal adapted to output the first set potential or the second set potential;

a first boosting circuit adapted to boost a voltage supplied from a power source and to output the boosted voltage to the output terminal;

a second boosting circuit adapted to boost the voltage supplied from the power source and to output the boosted voltage to the output terminal;

a voltage dividing circuit adapted to output a monitor potential by dividing the output potential outputted from the output terminal according to the first selection signal, or to output a monitor potential by dividing the output potential and reducing a voltage dividing ratio of the monitor potential with respect to the output potential according to the second selection signal;

a comparison amplifier adapted to compare the monitor potential with a reference potential, and to output a flag signal for activating the boosting circuit when the monitor potential is lower than the reference potential; and a logic circuit adapted to receive the flag signal from the comparison amplifier, and when receiving the first selection signal, to output a first clock signal for making the first boosting circuit perform the boosting operation, and adapted to receive the flag signal from the comparison amplifier, and when receiving the second selection signal, to output a second clock signal for making the second boosting circuit perform the boosting operation, together with the first clock signal.

2. The power source circuit according to claim 1, wherein the first boosting circuit has a boosting capability higher than that of the second boosting circuit.

3. The power source circuit according to claim 1, wherein the first boosting circuit and the second boosting circuit have a same circuit arrangement.

4. The power source circuit according to claim 1, wherein the logic circuit receives the second selection signal after receiving the first selection signal.

5. The power source circuit according to claim 2, wherein the logic circuit receives the second selection signal after receiving the first selection signal.

6. The power source circuit according to claim 3, wherein the logic circuit receives the second selection signal after receiving the first selection signal.

7. The power source circuit according to claim 1, wherein the voltage dividing circuit comprises:

a first resistor whose one end is connected to the output terminal;

a second resistor whose one end is connected to the other end of the first resistor;

a third resistor whose one end is connected to the other end of the second resistor;

a first switch circuit which is connected between the other end of the second resistor and a ground potential, and is turned on according to an input of the first selection signal; and a second switch circuit which is connected between the other end of the third resistor and the ground potential, and is turned on according to an input of the second selection signal, and the voltage dividing circuit outputs a potential at a point between the first resistor and the second resistor as the monitor potential.

8. The power source circuit according to claim 2, wherein the voltage dividing circuit comprises:

a first resistor whose one end is connected to the output terminal;

a second resistor whose one end is connected to the other end of the first resistor;

a third resistor whose one end is connected to the other end of the second resistor;

a first switch circuit which is connected between the other end of the second resistor and a ground potential, and is turned on according to an input of the first selection signal; and a second switch circuit which is connected between the other end of the third resistor and the ground potential, and is turned on according to an input of the second selection signal, and the voltage dividing circuit outputs a potential at a point between the first resistor and the second resistor as the monitor potential.

9. The power source circuit according to claim 3, wherein the voltage dividing circuit comprises:

a first resistor whose one end is connected to the output terminal;

a second resistor whose one end is connected to the other end of the first resistor;

a third resistor whose one end is connected to the other end of the second resistor;

a first switch circuit which is connected between the other end of the second resistor and a ground potential, and is turned on according to an input of the first selection signal; and a second switch circuit which is connected between the other end of the third resistor and the ground potential, and is turned on according to an input of the second selection signal, and the voltage dividing circuit outputs a potential at a point between the first resistor and the second resistor as the monitor potential.

10. The power source circuit according to claim 4, wherein the voltage dividing circuit comprises:

a first resistor whose one end is connected to the output terminal;

a second resistor whose one end is connected to the other end of the first resistor;

a third resistor whose one end is connected to the other end of the second resistor;

a first switch circuit which is connected between the other end of the second resistor and a ground potential, and is turned on according to an input of the first selection signal; and a second switch circuit which is connected between the other end of the third resistor and the ground potential, and is turned on according to an input of the second selection signal, and the voltage dividing circuit outputs a potential at a point between the first resistor and the second resistor as the monitor potential.

11. The power source circuit according to claim 5, wherein the voltage dividing circuit comprises:

a first resistor whose one end is connected to the output terminal;

a second resistor whose one end is connected to the other end of the first resistor;

a third resistor whose one end is connected to the other end of the second resistor;

a first switch circuit which is connected between the other end of the second resistor and a ground potential, and is turned on according to an input of the first selection signal; and a second switch circuit which is connected between the other end of the third resistor and the ground potential, and is turned on according to an input of the second selection signal, and the voltage dividing circuit outputs a potential at a point between the first resistor and the second resistor as the monitor potential.

12. The power source circuit according to claim 6, wherein the voltage dividing circuit comprises:

a first resistor whose one end is connected to the output terminal;

a second resistor whose one end is connected to the other end of the first resistor;

a third resistor whose one end is connected to the other end of the second resistor;

a first switch circuit which is connected between the other end of the second resistor and a ground potential, and is turned on according to an input of the first selection signal; and a second switch circuit which is connected between the other end of the third resistor and the ground potential, and is turned on according to an input of the second selection signal, and the voltage dividing circuit outputs a potential at a point between the first resistor and the second resistor as the monitor potential.

* * * * *